United States Patent
Lee et al.

(10) Patent No.: US 9,535,572 B2
(45) Date of Patent: Jan. 3, 2017

(54) DISPLAY APPARATUS, IMAGE PROCESSING APPARATUS AND CONTROL METHOD THEREOF

(75) Inventors: Jeong-yeon Lee, Seongnam-si (KR); Heui-jin Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1369 days.

(21) Appl. No.: 11/715,900

(22) Filed: Mar. 9, 2007

(65) Prior Publication Data

US 2007/0277105 A1 Nov. 29, 2007

(30) Foreign Application Priority Data

May 23, 2006 (KR) .................. 10-2006-0046100

(51) Int. Cl.
*G06F 3/048* (2013.01)
*G06F 3/0482* (2013.01)
*G06F 3/0481* (2013.01)
*G06F 3/0484* (2013.01)
*G06F 3/0486* (2013.01)
*H04N 5/445* (2011.01)
(Continued)

(52) U.S. Cl.
CPC .......... *G06F 3/0482* (2013.01); *G06F 3/048* (2013.01); *G06F 3/0481* (2013.01); *G06F 3/0484* (2013.01); *G06F 3/0486* (2013.01); *G06F 3/04817* (2013.01); *G06F 3/04842* (2013.01); *G06F 3/04845* (2013.01); *H04N 5/44543* (2013.01); *H04N 21/431* (2013.01); *H04N 21/4312* (2013.01); *H04N 21/4858* (2013.01)

(58) Field of Classification Search
CPC .... G06F 3/048; G06F 3/04817; G06F 3/0482; G06F 3/0484; G06F 3/04842; G06F 3/04845; G06F 3/0486; H04N 21/431; H04N 21/4312; H04N 5/44543; H04N 21/4858
USPC .................. 715/744, 762, 810, 815, 798
See application file for complete search history.

(56) References Cited

U.S. PATENT DOCUMENTS

| | | | | |
|---|---|---|---|---|
| 5,684,969 A | * | 11/1997 | Ishida | ............ 715/800 |
| 5,805,167 A | | 9/1998 | Van Cruyningen | |
| 6,426,761 B1 | * | 7/2002 | Kanevsky et al. | ............ 715/788 |

(Continued)

FOREIGN PATENT DOCUMENTS

| | | |
|---|---|---|
| CN | 1256457 | 6/2000 |
| CN | 1263616 | 8/2000 |

(Continued)

OTHER PUBLICATIONS

Communication, dated Apr. 15, 2013, issued by the Korean Intellectual Property Office in counterpart Korean Patent Application No. 10-2006-0046100.

(Continued)

*Primary Examiner* — Amy Ng
*Assistant Examiner* — Sajeda Muhebbullah
(74) *Attorney, Agent, or Firm* — Sughrue Mion, PLLC

(57) ABSTRACT

An image processing apparatus comprises a UI generating part to generate a first user interface including at least one UI menu item to select a function; a user input part to receive a user instruction to adjust a size of the UI menu item; and a controller to control the UI generating part to increase or decrease the size of the UI menu item of the first user interface depending on the user instruction, and display the UI menu item with the increased or decreased size.

30 Claims, 13 Drawing Sheets

(51) Int. Cl.
*H04N 21/431* (2011.01)
*H04N 21/485* (2011.01)

(56) References Cited

U.S. PATENT DOCUMENTS

| | | | |
|---|---|---|---|
| 6,466,235 B1* | 10/2002 | Smith et al. | 715/771 |
| 6,781,610 B2* | 8/2004 | Os et al. | 715/764 |
| 6,983,424 B1 | 1/2006 | Dutta | |
| 7,017,118 B1* | 3/2006 | Carroll | G06F 3/0481 345/160 |
| 7,020,845 B1* | 3/2006 | Gottfurcht et al. | 715/853 |
| 7,216,304 B1* | 5/2007 | Gourdol et al. | 715/835 |
| 7,257,202 B2* | 8/2007 | Umemura et al. | 379/88.14 |
| 7,263,670 B2* | 8/2007 | Rekimoto | G06F 9/4443 715/764 |
| 7,313,765 B2* | 12/2007 | Taylor et al. | 715/788 |
| 7,477,322 B2* | 1/2009 | Hsieh | 348/569 |
| 7,610,599 B1 | 10/2009 | Nashida et al. | 725/38 |
| 7,631,274 B2* | 12/2009 | Kumagai et al. | 715/815 |
| 8,316,312 B2 | 11/2012 | Kim et al. | |
| 2002/0126153 A1 | 9/2002 | Withers et al. | |
| 2003/0004983 A1* | 1/2003 | Cohen | 707/500 |
| 2004/0090470 A1 | 5/2004 | Kim et al. | |
| 2005/0223339 A1* | 10/2005 | Lee | 715/825 |
| 2006/0025920 A1* | 2/2006 | Nezu et al. | 701/200 |
| 2006/0059438 A1* | 3/2006 | Ko et al. | 715/800 |
| 2006/0101343 A1* | 5/2006 | Machida | 715/744 |
| 2008/0189653 A1* | 8/2008 | Taylor et al. | 715/792 |

FOREIGN PATENT DOCUMENTS

| | | |
|---|---|---|
| EP | 1174787 A2 | 1/2002 |
| JP | 7-281863 A | 10/1995 |
| JP | 9-238291 A | 9/1997 |
| KR | 1996-0040058 A | 11/1996 |
| KR | 10-2001-0097418 A | 11/2001 |
| KR | 2002-0000714 A | 1/2002 |
| KR | 10-2004-0018663 A | 3/2004 |
| KR | 10-2004-0039003 A | 5/2004 |
| KR | 10-2004-0082827 A | 9/2004 |
| KR | 10-2006-0001448 A | 1/2006 |
| KR | 10-2010-0133778 A | 12/2010 |

OTHER PUBLICATIONS

Communication issued Aug. 7, 2012 by the Korean Intellectual Property Office in counterpart Korean Application No. 10-2006-0046100.

* cited by examiner

DISPLAY APPARATUS, IMAGE PROCESSING APPARATUS AND CONTROL METHOD THEREOF

CROSS-REFERENCE TO RELATED APPLICATIONS

This application claims priority from Korean Patent Application No. 10-2006-0046100, filed on May 23, 2006, in the Korean Intellectual Property Office, the entire disclosure of which is incorporated by reference.

BACKGROUND OF THE INVENTION

Field of the Invention

Methods and apparatuses consistent with the present invention relate to display, image processing control, and more particularly, to a display apparatus, an image processing apparatus and a control method thereof, which can adjust a size of a UI menu item of a user interface according to a user's preference.

Description of the Related Art

Generally, a display apparatus such as a TV, a mobile phone, a Personal Digital Assistant (PDA), and a Portable Multimedia Player (PMP) displays a user interface (hereinafter referred to as "UI") to select a UI menu item on a screen. At this time, the user interface may include UI menu items that may be formed in various types. For example, the UI menu items may be arranged in a horizontal and/or vertical line. UI menu items, each of which has a text list, may also be formed. UI menu items, each of which has a label, may be formed in two dimensions. UI menu items, each of which has an elliptic shape or a circular shape to rotate, may be formed.

In a conventional art user interface, there are various methods by which a user may select a UI menu item. For example, the user may typically use a moving highlight or a fixed highlight to select a UI menu item by manipulating buttons up and down and/or right and left.

However, depending on the conventional art user interface, a size value of a UI menu item to be displayed on a screen is preset so that the UI menu item having a constant size corresponding to the preset size value is always displayed. Accordingly, if a plurality of UI menu items with constant size are formed, when a current-highlighted UI menu item is far away from a desired UI menu item, highlighting the desired UI menu item may be complicated. In particular, when the UI menu includes a lot of UI menu items, a problem may occur when highlighting the desired UI menu item.

Further, according to the conventional art user interface, as described above, the size value of a UI menu item to be displayed on a screen may be preset regardless of the user's preference. Accordingly, the user cannot select a desired UI menu item directly and easily. In particular, when a child or an impaired adult tries to select a desired UI menu item, they may have trouble accessing and controlling their user interface because it takes time to become familiar with how to access and control the user interface without adequate explanation.

If an input means such as a touch screen is employed, when the UI menu item includes a preset small size value, it is difficult to exactly select a desired UI menu item without inconvenience. Conversely, even if the UI menu item has a preset size value that is large, the user interface includes limitable UI menu items that can be displayed on a screen at once so that the user interface may not display all desired UI menu items at once.

SUMMARY OF THE INVENTION

Accordingly, an aspect of the present invention provides a display apparatus, an image processing apparatus, and a controlling method thereof, which can adjust a size of a UI menu item of a user interface depending on a user's preference. For example, a user can alleviate the difficult process of selecting desired UI menu items by increasing the size of his or her often-used UI menu items. Accordingly, the user can simply access the UI menu items.

It is also an aspect of the present invention to provide the display apparatus, the image processing apparatus, and the controlling method thereof, which can adjust a size of preferential UI menu items depending on the user' preference so that the user can directly access the preferential UI menu item without difficulty.

It is also an aspect of the present invention to provide the display apparatus, the image processing apparatus, and the controlling method thereof, which can adjust the size of the user's preferential UI menu items depending on a user's preference so that the user can exactly and conveniently select the preferential UI menu item of a user interface.

Additional aspects and/or advantages of the present invention will be set forth in part in the description which follows and, in part, will be obvious from the description, or may be learned by practice of the present invention.

The foregoing and/or other aspects of the present invention are achieved by providing an image processing apparatus, comprising: a UI generator, which generates a first user interface including at least one UI menu item for selecting a function; a user input, which receives a user instruction to adjust a size of the UI menu item; and a controller, which controls the UI generator in order to increase or decrease the size of the UI menu item of the first user interface based on the user instruction, and to display the UI menu item increased or decreased in size.

According to another aspect of the present invention, the UI menu item occupies at least one of a plurality of latticed sections into which the first user interface is divided.

According to another aspect of the present invention, the UI generator generates a second user interface for selecting the UI menu item to be decreased or increased in size and for determining the size of the selected UI menu item based on the user instruction, and the controller controls the UI generator in order to decrease or increase the size of the UI menu item based on the determined size.

According to another aspect of the present invention, the second user interface comprises a plurality of names of the UI menu items of the first user interface, and at least one of current sizes of the UI menu items and size ranges of the UI menu items capable of being decreased or increased.

According to another aspect of the present invention, the UI generator generates a third user interface for selecting the UI menu item to be decreased or increased in size and an area corresponding to the UI menu item based on the user instruction, and the controller controls the UI generator to decrease or increase the size of the UI menu item so that the UI menu item occupies the area.

According to another aspect of the present invention, the third user interface comprises an identity-number that is allotted to at least one of the UI menu item to be and the area to be selected.

According to another aspect of the present invention, the controller controls the UI generating part so that two UI menu items of the plurality of UI menu items having different sizes and being displayed exchange their different sizes.

According to another aspect of the present invention, the controller controls the UI generator so that the two UI menu items exchange their positions.

The foregoing and/or other aspects of the present invention are also achieved by providing a display apparatus, comprising: a UI generator to generate a user interface (UI) including at least one UI menu item having a predetermined size to select a function; a display which displays the user interface; a user input part to receive a user instruction to adjust a size of the UI menu item; and a controller to control the UI generating part to increase or decrease the UI menu item of the user interface in size based on the user instruction, and display the UI menu item increased or decreased in size on the display.

According to another aspect of the present invention, the user input part comprises a touch screen equipped in the display.

The foregoing and/or other aspects of the present invention are also achieved by providing a method of controlling an image processing apparatus, comprising: generating a first user interface including at least one UI menu item for selecting a function; receiving a user instruction to adjust a size of the UI menu item; and increasing or decreasing the size of the UI menu item based on the user instruction.

According to another aspect of the present invention, the UI menu item is formed with a size to occupy at least one of a plurality of latticed sections into which the first user interface is divided.

According to another aspect of the present invention, the method further comprises generating a second user interface to select the UI menu item to be decreased or increased in size and to determine its size based on the user instruction, and decreasing or increasing the size of the UI menu item based on the determined size of the UI item.

According to another aspect of the present invention, the second user interface comprises a plurality of names of the UI menu items of the first user interface, and at least one of current sizes of UI menu items and size ranges of the UI menu items capable of being decreased or increased.

According to another aspect of the present invention, the method further comprises generating a third user interface to select the UI menu item to be decreased or increased in size and an area corresponding to the UI menu item based on the user instruction, and decreasing or increasing the size of the UI menu item so that the UI menu item occupies the area.

According to another aspect of the present invention, the third user interface comprises an identity-number that is allotted to at least one of the UI menu item to be and the area to be selected.

According to another aspect of the present invention, the decreasing or increasing of the size of the UI menu item comprises allowing two UI menu items of the plurality of UI menu items having different sizes to exchange their different sizes.

According to another aspect of the present invention, the decreasing or increasing of the size of the UI menu item further comprises allowing the two UI menu items to exchange their positions.

The foregoing and/or other aspects of the present invention are also achieved by providing a method of controlling a display apparatus, comprising: generating a user interface including at least one UI menu item for selecting a function, wherein the UI menu item has a predetermined size; displaying the user interface; receiving a user instruction to adjust a size of the UI menu item; and increasing or decreasing the size of the UI menu item based on the user instruction and displaying the UI menu item increased or decreased in size.

BRIEF DESCRIPTION OF THE DRAWINGS

The above and/or other aspects and advantages of the present invention will become apparent from the following description of the exemplary embodiments, taken in conjunction with the accompanying drawings of which.

DETAILED DESCRIPTION OF EXEMPLARY EMBODIMENTS

Figure 1:
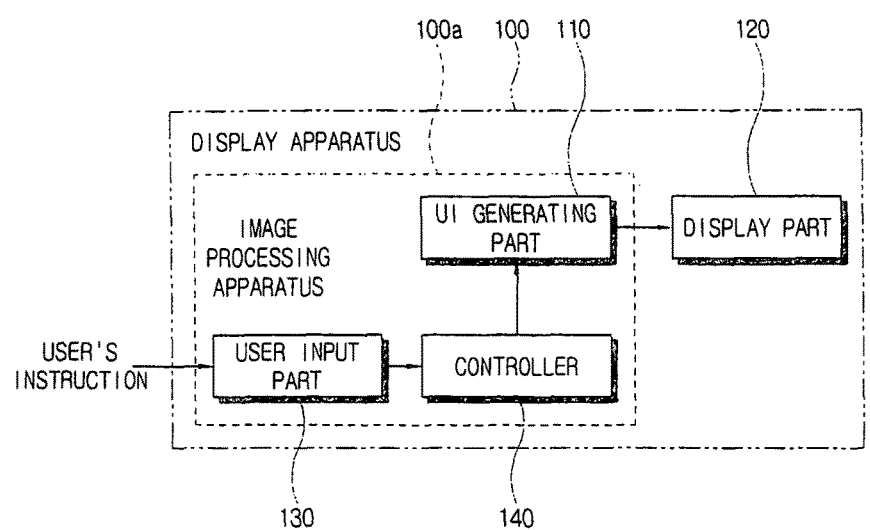
FIG. 1 is a block diagram illustrating a configuration of a display apparatus according to an exemplary embodiment of the present invention.

Reference will now be made in detail to exemplary embodiments of the present invention, examples of which are illustrated in the accompanying drawings, wherein like reference numerals refer to like elements throughout.

FIG. 1 is a block diagram illustrating a configuration of a display apparatus 100 according to an exemplary embodiment of the present invention. In the exemplary embodiment of the present invention, the display apparatus 100 displays a user interface on a screen to interface with a user. For example, the display apparatus 100 may include portable devices such as a mobile phone, a portable data assistant (PDA), and a portable media player (PMP). Further, the display apparatus 100 may include a television (TV).

As illustrated in FIG. 1, the display apparatus 100 include a UI generating part 110, a display part 120, a user input part 130, and a controller 140. The UI generating part 110 generates a user interface including at least one of a plurality of UI menu items for a user to select operations of the display apparatus 100. The display part 120 displays the user interface generated by the UI generating part 110. Herein, the displaying part 120 may include a Liquid Crystal Display (LCD) to display the user interface thereon, and the like. Through the user input part 130, a user inputs his or her instruction to adjust a size of the UI menu item of the user interface. Herein, the user input part 130 may include at least one input means such as a button to receive the instruction from the user.

The controller 140 generally controls the respective parts of the display apparatus 100. In the exemplary embodiment of the present invention, the controller 140 controls the UI generating part 110 to adjust a size of the UI menu item of the user interface according to a user's instruction. For example, the controller 140 controls the UI generating part 110 to increase or decrease the size of the UI item menu of the user interface according to the user's instruction.

Figure 2:
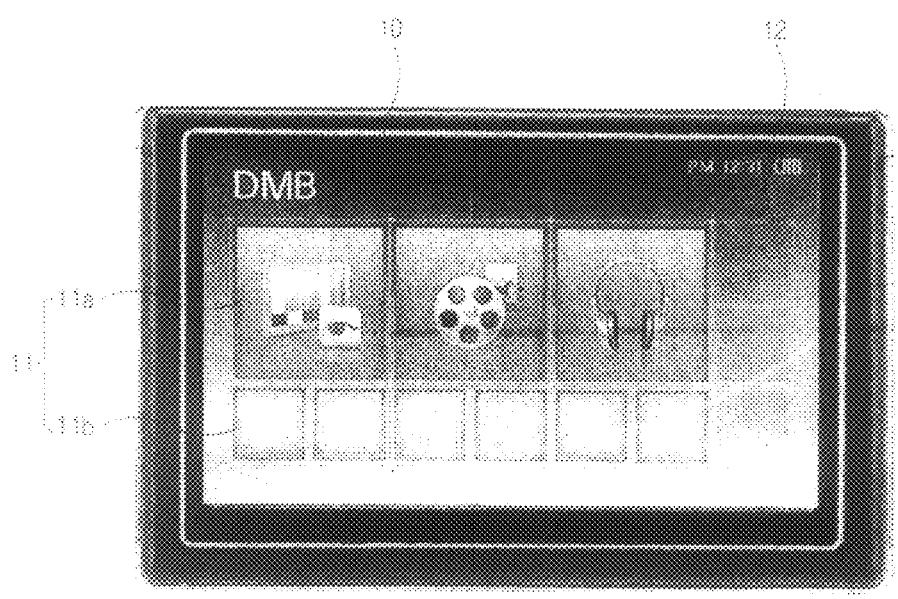
FIGS. 2 through 4 are diagrams illustrating a first user interface of the display apparatus according to the exemplary embodiment of the present invention.

FIG. 2 is a diagram illustrating a first user interface 10 of the display apparatus 100 according to the exemplary embodiment of the present invention. The first user interface 10 may be displayed as a main menu screen. In the exemplary embodiment of the present invention, the user interface 10 includes at least one UI menu item 11. Each UI menu item 11 may have an iconic shape to select a function of the display apparatus 100. Also, the UI menu item 11 may include an image to represent the function of the display apparatus 100. For example, the UI menu item 11 may include an image to represent the function of the display apparatus 100 such as watching a broadcasting program or a movie, listening to the music, reading a text or an E-mail letter, and the like.

Figure 3:
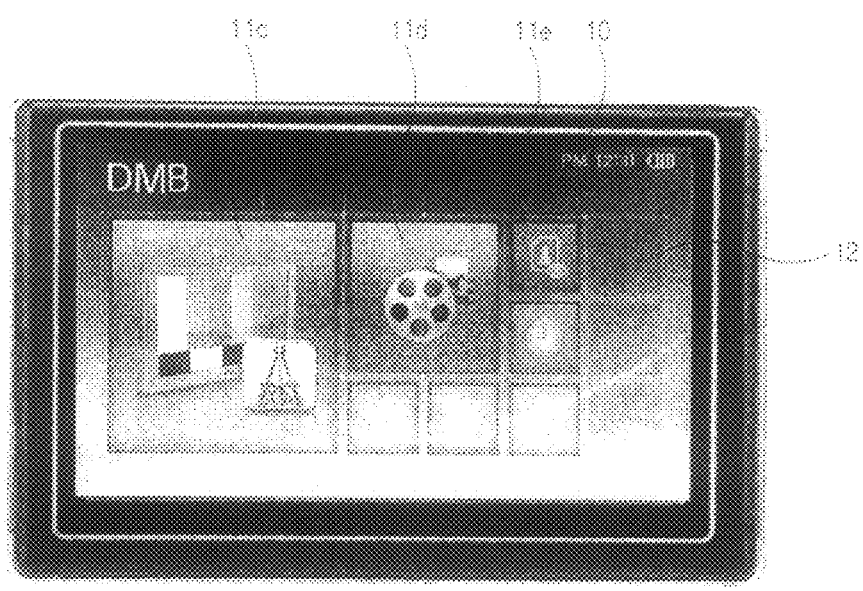
Figure 4:
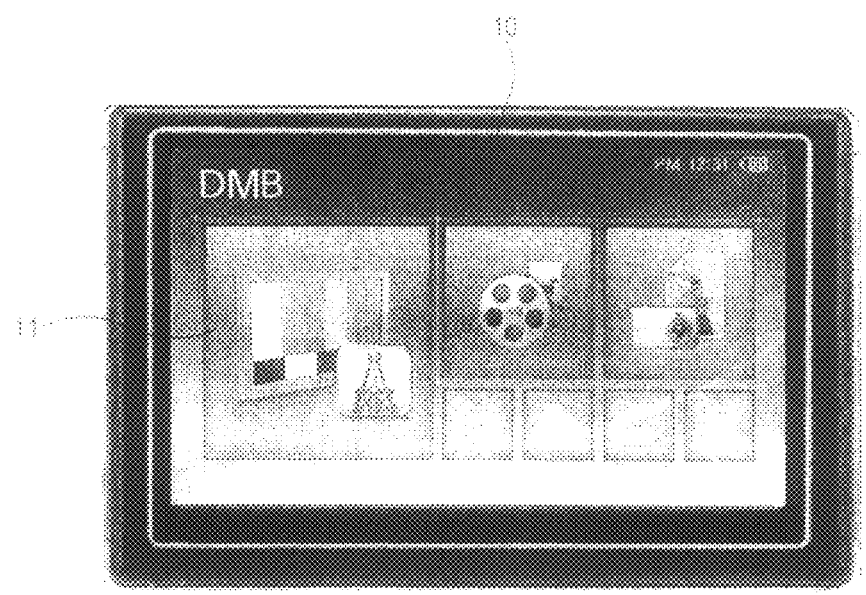

The UI menu item 11 may be formed as an icon having predetermined size on the user interface. In the exemplary embodiment of the present invention, the UI menu item 11 is formed as an icon having an enough size to occupy at least one of latticed sections 12 that the user interface 10 is divided into. For example, as illustrated in FIG. 2, a first UI menu item 11a of plural UI menu items occupies four sections 12, and a second UI menu item 11b occupies one section 12. Here, each size of the UI menu items 11 may be preset. However, the number of the sections 12 occupied by the UI menu item 11, that is the size of the UI menu item 11, is not limitable to this exemplary embodiment. Alternatively, the size of the UI menu item 11 may vary as illustrated in FIGS. 3 and 4.

Further, in the exemplary embodiment of the present invention, the UI menu item 11 may be formed as an icon having a predetermined size and positioned at the preset section group corresponding to the predetermined size. At this time, the section group may include at least one section 12. For example, the UI menu item 11 having a bigger size may be positioned upper and more left, and the UI menu item having a smaller size may be displayed lower and more right according to a preset configuration of the section group. Particularly, as illustrated in FIG. 3, a third UI menu item 11c having the biggest size is positioned at a leftmost section group. A fourth UI menu item 11d having a second-biggest size is positioned at a section group next to the third UI menu item 11c. Finally, fifth UI menu items 11e having a smallest size are positioned at a lower section 12 and a right section 12 of the fourth UI menu item 11d. However, the preset configuration of the section groups where the respective UI menu items 11 having various sizes are positioned is not limitable to this exemplary embodiment. Alternatively, various configurations of the section group may be preset or determined.

Figure 5:
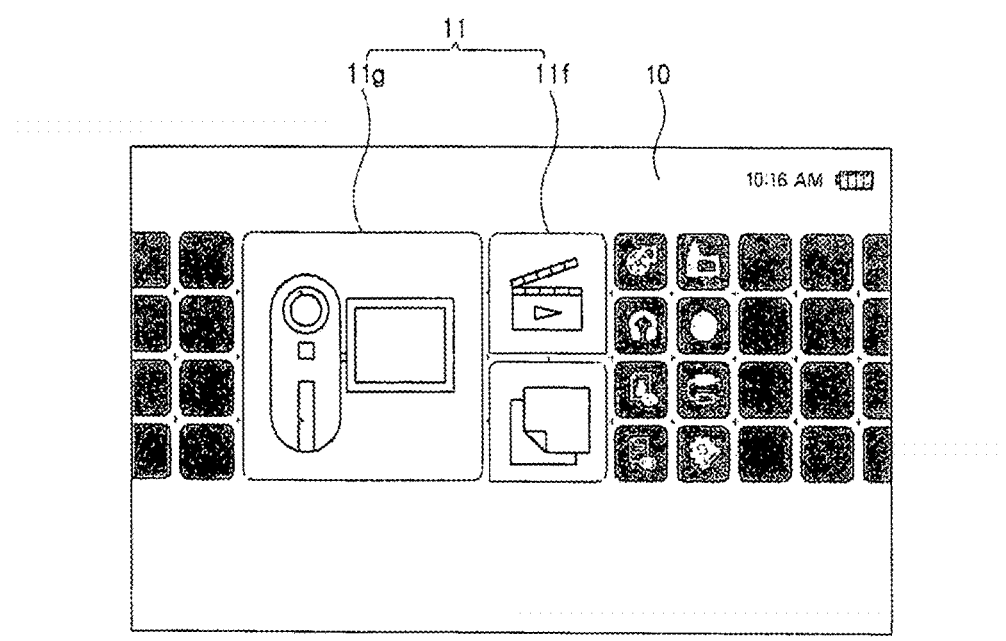
FIGS. 5 and 6 are other diagrams illustrating the first user interface of the display apparatus according to the exemplary embodiment of the present invention.
Figure 6:
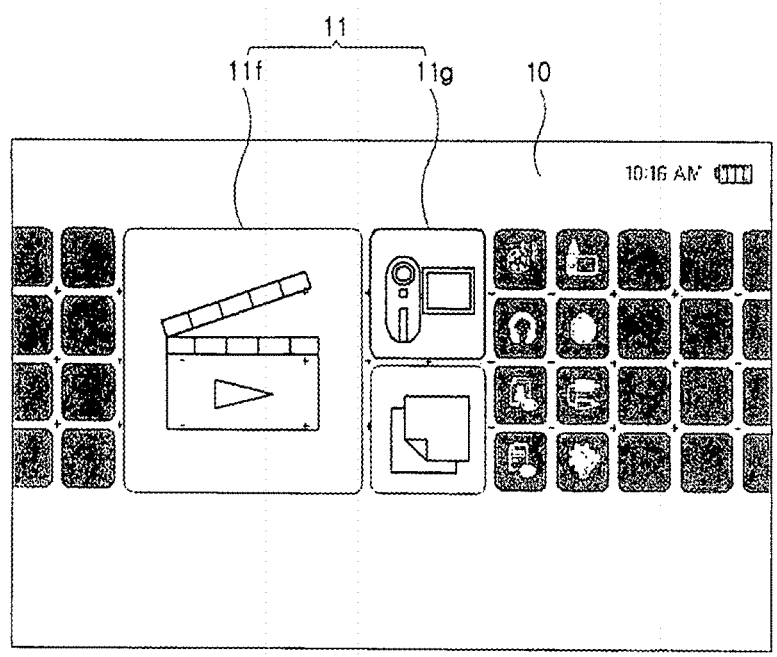

The controller 140 controls the UI generating part 110 to increase or decrease one of the plural UI menu items of the first user interface 10 in size depending on a user's instruction, and to display the first user interface 10. In the exemplary embodiment of the present invention, the controller 140 controls the UI generating part 110 to increase the size of one of plural UI menu items depending on the user's instruction. For example, as illustrated in FIG. 5, when a user selects to increase the size of a sixth UI menu item 11f of the plural UI menu items 11 having various different sizes and to position the sixth UI menu item 11f at a position of section group where the seventh UI menu item 11g was positioned, as illustrated in FIG. 6, the sixth UI menu item 11f is increased in size as big as the seventh UI menu item 11g and positioned at the position of the seventh UI menu item 11g. At the same time, the seventh UI menu item 11g is decreased in size as small as an original size of the sixth UI menu item 11f and positioned at another position of section group where the sixth UI menu item 11f has just positioned. That is, when a user selects the sixth UI menu item 11f to increase the size of the sixth UI menu item, the sixth UI menu item 11f and the seventh UI menu item 11g exchange their positions and their sizes.

Figure 7:
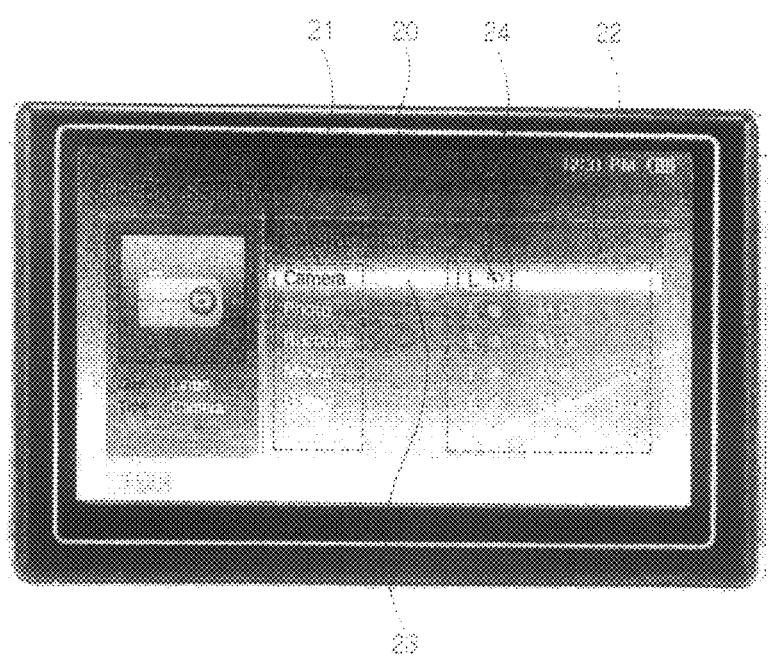
FIGS. 7 through 9 are diagrams illustrating a second user interface of the display apparatus according to the exemplary embodiment of the present invention.
Figure 8:
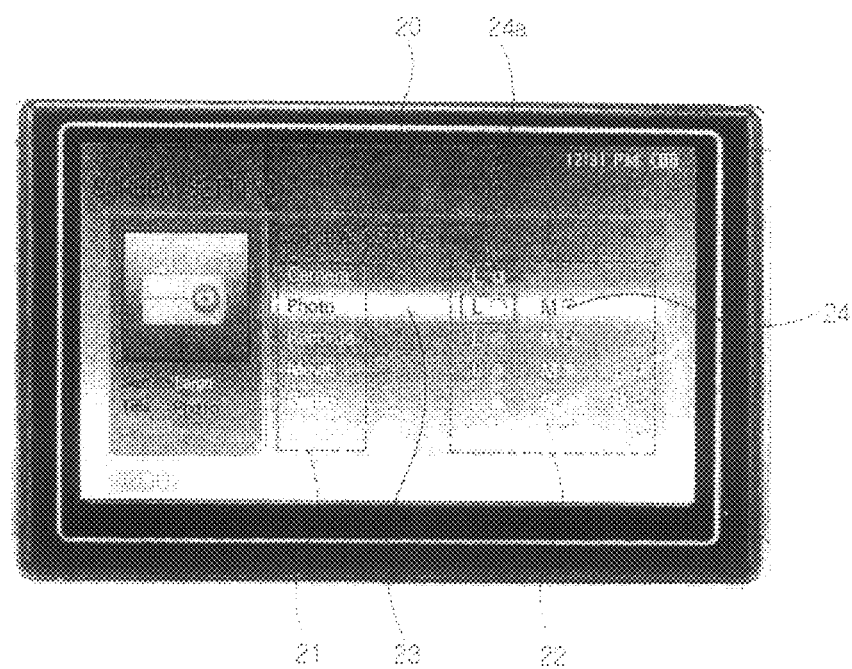
Figure 9:
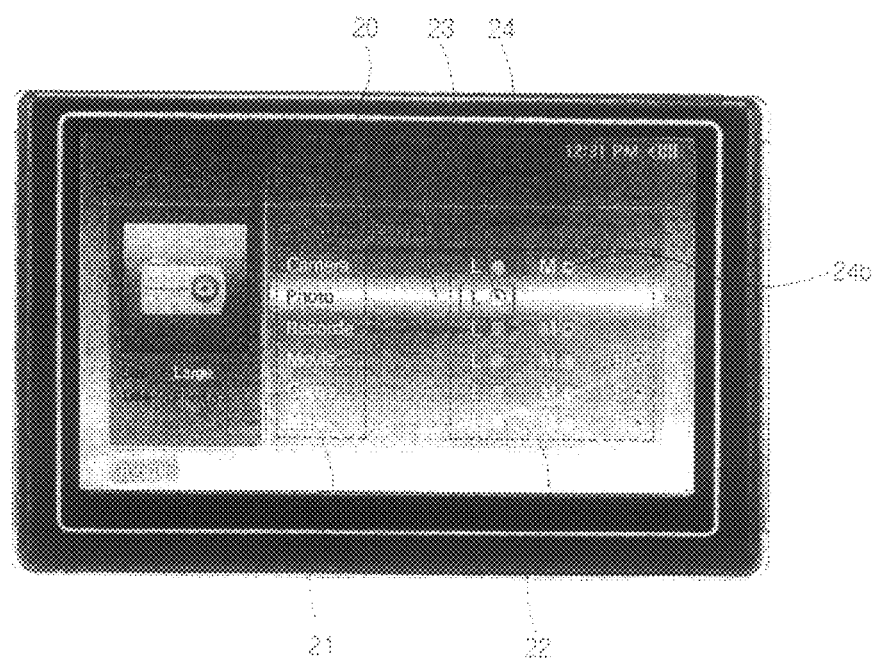

FIGS. 7 through 9 are drawings illustrating a second user interface 20 of the display apparatus 100 according to the exemplary embodiment of the present invention. The second user interface 20 is an example of a screen to set up a size of the UI menu item 11. In the exemplary embodiment of the present invention, the second user interface 20 includes a name item 21 and a size item 22 corresponding to the UI menu item 11 to be positioned thereon. For example, when the second user interface 20 includes the name items 21 corresponding to a plurality of UI menu items 11 to be positioned thereon, as illustrated in FIG. 7, the name items 21 of the plural UI menu items 11 such as "Camera," "Photo," "Record," "Movie," "Game," and "Music" are listed up on the second user interface 20.

The second user interface 20 includes the size items 22 corresponding to a plurality of UI menu items 11. Further, the size items 22 may be positioned next to the name items 21. For example, as illustrated in FIG. 7, the respective size items 22 positioned on the user interface 20 may be classified into a large size group L, a middle size group M, and a small size group S. In the exemplary embodiment of the present invention, one size group having a point 24 among the three size groups L, M, and S represents the size group corresponding to the current UI menu item, and the other size groups without the point 24 represents size groups having concerned sizes of which the current UI menu item may be changed. For example, as illustrated in FIG. 7, the "Camera" item belongs to the large size group L, and the point 24 is put on the large size group L. The "Photo" item and the "Record" item belong to the middle size group M, and the point 24 is put on the middle size group M. Finally, the "Movie" item, the "Game" item, and the "Music" item belong to the small size group S, and the point 24 is put on the small size group S (refer to the point 24 put on the respective size groups by name as illustrated in FIG. 7). Further, the "Photo" item and the "Record" item, respectively corresponding to the middle size group M having the points 24 between the two groups M and L may increase its size by moving the point 24 from the middle size group M to the large size group L. Similarly, the "Movie" item, the "Game" item and the "Music" item, respectively corresponding to the small size group S having the points 24 among the three size groups S, M, and L may increase its size by moving the point 24 from the small size group S to the middle size group M or the large size group L (refer to FIG. 7).

When a user selects one of the name items 21 of the menu item 11, the selected name item 21 is highlighted by name item. Accordingly, the user may move a highlight 23 by manipulating the user input part 130 to select one of the name items 21. For example, as illustrated in FIGS. 7 and 8, the user may select the "Photo" item below the "Camera" item to increase it in size by moving the highlight 23 downward from the "Camera" item to the "Photo" item.

In addition, the user may determine a size of the menu item 11 to be increased by manipulating the user input part 130 and moving the point 24 from the small size group S or the middle size group M to the middle size group M or the large size group L. For example, as illustrated in FIGS. 8 and 9, the user may increase the "Photo" item from the middle size to the large size by moving the point 24 from the middle size group M to the large size group L. At this time, it is preferable but not necessary that the "Camera" item is decreased from the large size to the middle size by moving the point 24 from the large size group L to middle size group M (refer to 24*a* of FIGS. 8 and 24*b* of FIG. 9).

Figure 10:
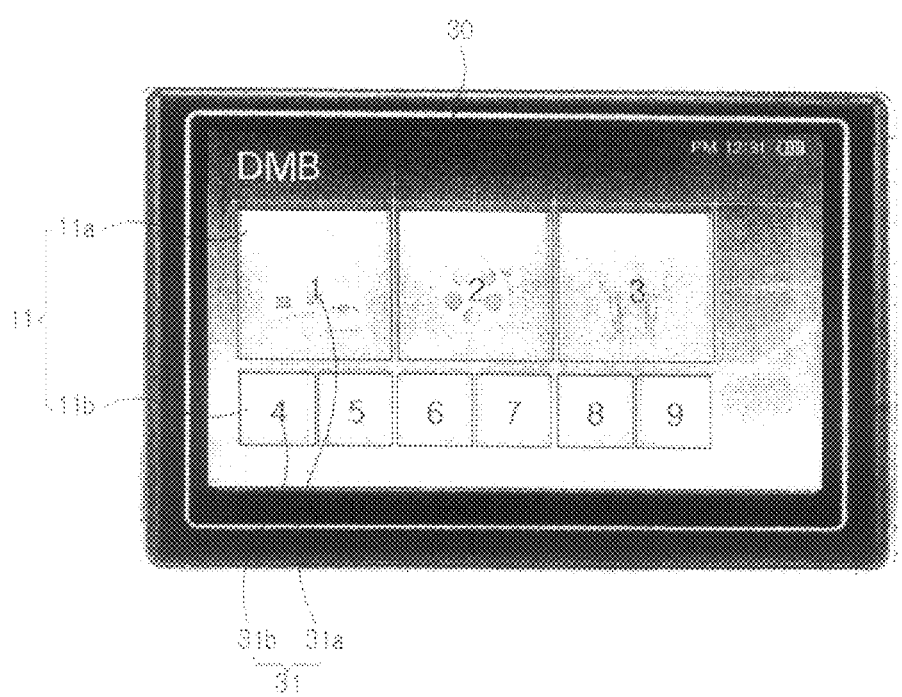
FIG. 10 is a diagram illustrating a third user interface of the display apparatus according to the exemplary embodiment of the present invention.

FIG. 10 is a drawing illustrating a third user interface 30 of the display apparatus 100 according to the exemplary embodiment of the present invention. The third user interface 30 is another example of a screen for setting up a size of the UI menu item 11. The third user interface 30 includes identity-numbers 31 corresponding to an area occupied by the UI menu items 11 that has been positioned on the user interface 10. At this time, the area may include at least one section 12. For example, as illustrated in FIG. 10, the third user interface 30 includes an identity-number '1' 31*a* corresponding to an area occupied by the first UI menu item 11*a*, an identity-number '4' 31*b* corresponding to another area occupied by the second item menu 11*b*, and the like. Here, as illustrated in FIG. 2, the first UI menu item 11*a* and the second item menu 11*b* have been positioned in separate section groups on the first user interface 10. Also, the identity-numbers '1' 31*a* of a first menu item and the identity-number '4' 31*b* of a second menu item are displayed at separate areas on the third user interface 30, as shown in FIG. 10.

A user may determine a UI menu item 11 to be increased its size and its desired size by selecting the identity-numbers 31 of the area through the user input part 130. That is, the user may determine a UI menu item 11 to increase its size and its necessary size by selecting the identity-number 31 corresponding to an area occupied by the UI menu item 11 and the identity-number 31 corresponding to another area occupied by another UI menu item 11 with the desired size. For example, as illustrated in FIG. 10, when the user wants to increase the size of the second UI menu item 11*b* to be as big as the first UI menu item 11*a*, and the increased second UI menu item 11*b* to be displayed at the area of the first UI menu item 11*a*, the user may select the first identity-number '4' 31*b* corresponding to area that has been occupied by the second UI menu item 11*b*, and then the second identity-number '1' 31*a* corresponding to the area that has been occupied by the first UI menu item 11*a* on the first user interface 10. Accordingly, the user can increase the size of the second UI menu item 11*b* to be as big as the first UI menu item 11*a*, and display the increased second UI menu item 11*b* at the area of the first UI menu item 11*a*. Here, the user may select the first identity-number '4' 31*b* and the second identity-number '1' 31*a* regardless of a selecting sequence.

On the other hand, methods for selecting the identity-numbers 31 of the UI menu items 11 may vary. For example, the user may select the identity-numbers 31 by directly inputting the identity-numbers 31, highlighting the identity-numbers 31 and/or moving the highlight through the user input part 130. Herein, the user input part 130 may include a number input button (not shown), a moving button (not shown) to move upward, downward, left, and right, and the like.

In the exemplary embodiment of the present invention, a computer program may operate the controller 140. Herein, the controller 140 may include a storing means such as a ROM (Read Only Memory) and a RAM (Random Access Memory) to store the computer program, and a micropro-cessor such as a CPU (Central Processing Unit) to operate the computer program.

Figure 11:
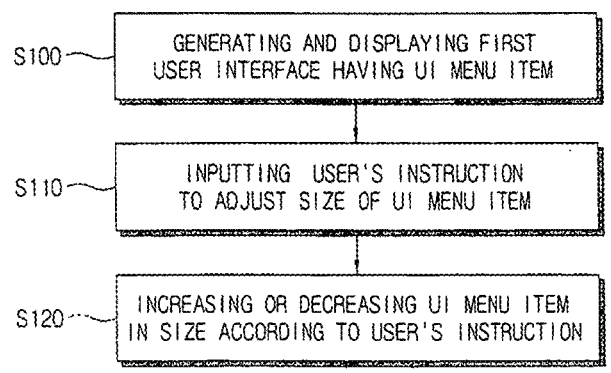
FIGS. 11 through 13 are flowcharts illustrating operations of the display apparatus according to the exemplary embodiment of the present invention.
Figure 12:
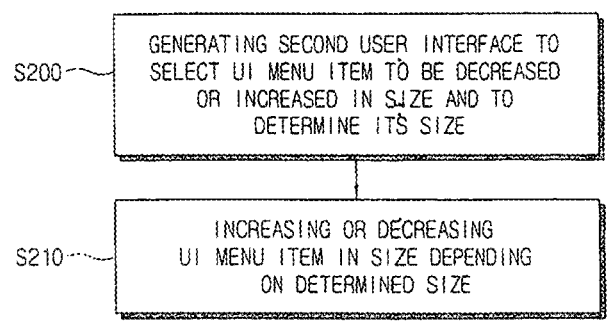
Figure 13:
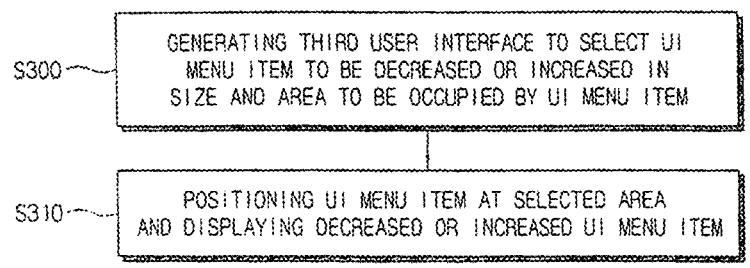

FIGS. 11 through 13 are flowcharts illustrating operations of the display apparatus 100 according to the exemplary embodiment of the present invention. As illustrated in FIG. 11, when a user inputs a user instruction to display a main menu screen through the user input part 130, the controller 140 of the display apparatus 100 controls the UI generating part 110 to generate the first user interface 10 including at least one UI menu item 11, and the display part 120 to display the generated first user interface 10 thereon (S100). Then, the user inputs another instruction to adjust a size of the UI menu item 11 through the user input part 130 (S110). Based on a result of the instruction in operation S110, the controller 140 controls the UI generating part 110 to increase or decrease the size of a determined UI menu item of the first user interface 10, and the display part 120 to display it thereon (S120).

Particularly, in operation S120, as illustrated in FIG. 12, the controller 140 controls the UI generating part 110 to generate the second user interface 20 to determine a desired UI menu item 11 and its size and to display the second user interface 20 (S200). Then, the controller 140 controls the UI generating part 110 to adjust a size of the determined UI menu item 11 based on the determined size, and the display part 120 to display the UI menu item having the adjusted size thereon (S210).

Alternatively, as illustrated in FIG. 13, the controller 140 controls the UI generating part 110 to generate the third user interface to select a UI menu item to be decreased or increased and an area to be occupied by the UI menu item (S300). Here, first and second identity-numbers 31 may corresponds to respective areas occupied by a desired UI menu item 11 and another UI menu item 11 having a desired size. Also, the controller 140 controls the display part 130 to display the third user interface 30. Then, the controller 140 controls the UI generating part 110 to position the selected UI menu item at the selected area (S310). Also, the controller 140 controls the display part 120 to display the third selected UI menu of the user interface 30 thereon.

Although a few exemplary embodiments of the present invention have been shown and described, it will be appreciated by those of ordinary skill in the art that changes may be made in these exemplary embodiments without departing from the principles and spirit of the invention, the scope of which is defined in the appended claims and their equivalents. For example, the display apparatus 100 may include a touch screen (not shown) to sense a contact of the user instead of the user input part 130 and the display part 120. At this time, the user may determine a desiring UI menu item and its section group by directly contacting the touch screen (not shown). Accordingly, the user can exactly, conveniently select the necessary item and the selection group by increasing the size of his or her often-used or preferential UI menu items rather than other UI menu items.

On the other hands, the present invention may be applied for an image processing apparatus 100*a* such as a set top box (not shown) for a TV to process a user interface displayed on a screen of the TV (refer to FIG. 1, 100*a*). At this time, in the exemplary embodiment of the present invention, the image processing apparatus 100*a* may include a configuration as the same or almost same as that of the display apparatus 100 excluding a display part 120.

As apparent from the above description, according to the present invention, a size of a UI menu item on a user interface can be adjusted depending on a user's preference, thereby facilitating prompt selection of the UI menu item and improving convenience when manipulating the user interface. For example, a user can alleviate the difficult process of selecting desired UI menu items by increasing the size of his or her often-used UI menu items rather than other UI menu items. Accordingly, the user can simply access the necessary UI menu items without trouble.

Also, according to the present invention, the user can directly access his or her preferential UI menu item without difficulty by adjusting a size of preferred a UI menu item based on a user's preference, thereby satisfying the user's preference and improving agility and convenience when manipulating the user interface.

In Particular, according to the present invention, the user can exactly and conveniently select his or her preferential UI menu item on a user interface such as a touch screen by adjusting a size of the preferred UI menu item based on a user's preference, thereby more exactly selecting the UI menu items and improving the convenience when manipulating the user interface.

What is claimed is:

1. An image processing apparatus, comprising:
   a user interface (UI) generator that shows a plurality of section groups, wherein a first section group, which occupies a first area on the user interface, has at least two UI menu items of a first display size, and a second section group, which occupies a second area on the user interface, has at least two UI menu items of a second display size different from the first display size;
   a user input part which receives a user input; and
   a controller which receives a first user input selecting a first UI menu item in the first section group, receives a second user input selecting a second UI menu item in the second section group, receives a third user input for switching the first UI menu item and the second UI menu item, controls the UI generator to move the selected first UI menu item to the second section group and to display the moved first menu item with the second display size based on the first user input, the second user input, and the third user input, and controls the UI generator to move the selected second UI menu item to the first section group and to display the moved second menu item with the first display size based on the first user input, the second user input, and the third user input,
   wherein the first UI menu item and the second UI menu item are executable upon further user input,
   wherein the controller comprises a processor,
   wherein the user interface comprises a plurality of latticed sections formed to be visibly distinct from each other and to include a UI menu item therein, respectively, and each of the plurality of section groups is assigned a different number of latticed sections from among the plurality of latticed sections.

2. The image processing apparatus according to claim 1, wherein
   the UI generator generates a second user interface for selecting the UI menu item to be decreased or increased in size and for determining the size of the UI menu item based on the user input, and
   the controller controls the UI generator to decrease or increase the size of the selected UI menu item based on the determined size of the UI menu item.

3. The image processing apparatus according to claim 2, wherein
   the second user interface comprises a plurality of names of the UI menu items of the first user interface, and at least one of current sizes of the UI menu items and size ranges of the UI menu items capable of being decreased or increased.

4. The image processing apparatus according to claim 2, wherein the first user interface is a touch screen of a mobile station.

5. The image processing apparatus according to claim 1, wherein
   the UI generator generates a third user interface for selecting the UI menu item to be decreased or increased in size and an area corresponding to the UI menu item based on the user input, and
   the controller controls the UI generator to decrease or increase the size of the UI menu item so that the UI menu item occupies the area.

6. The image processing apparatus according to claim 5, wherein
   the third user interface comprises an identity-number that is allotted to at least one of the UI menu item and the area.

7. The image processing apparatus according to claim 1, wherein:
   the controller causes a selection of largest UI menu item from the two UI menu items to perform the corresponding function based on additional user input, and
   prior to the selecting the largest UI menu item, the controller controls the UI generator so that the two UI menu items are exchanged in size such that the selected largest UI menu item of the two UI menu items is displayed in a larger size than the other one of the two UI menu items.

8. The image processing apparatus according to claim 1, wherein each of the plurality of latticed sections is one of a rectangular area occupying a portion of the first user interface, a square area occupying a portion of the first user interface, or a triangular area occupying a portion of the first user interface.

9. The image processing apparatus according to claim 1, wherein largest UI menu item is displayed at a predetermined position in the first user interface such that the position of the UI menu item is at least in part determined based on the respective size of the UI menu item.

10. The image processing apparatus according to claim 1, wherein the display size of the first UI menu item and the second UI menu item is predetermined based on a respective section.

11. The image processing apparatus according to claim 1, wherein the plurality of section groups further comprise a third section group comprising a single UI menu item of a third size, wherein the third size is larger than the first display size and the second display size, and wherein the controller controls to execute the single UI menu item in the third section group upon said further user input.

12. The apparatus of claim 1, wherein said each of the plurality of section groups is assigned said different number of latticed sections from among the plurality of latticed sections based on user input.

13. The apparatus of claim 1, further comprising allocating at least one of a plurality of UI menu items to a respective section group from among the plurality of section groups based on user input.

14. The apparatus of claim 1, wherein the plurality of UI menu items are assigned to a respective section group from among the plurality of section groups based on frequency of use.

15. A display apparatus, comprising:
   a user interface (UI) generator that shows a plurality of section groups, wherein a first section group, which occupies a first area on the user interface, has at least two UI menu items of a first display size, and a second section group, which occupies a second area on the user interface, has at least two UI menu items of a second display size different from the first display size;
a display which displays the at least two UI menu items of the first and the second section groups;
a user input part which receives a user input; and
a controller which receives a first user input selecting a first UI menu item in the first section group, receives a second user input selecting a second UI menu item in the second section group, receives a third user input for switching the first UI menu item and the second UI menu item, controls the UI generator to move the selected first UI menu item to the second section group and to display the moved first menu item with the second display size based on the first user input, the second user input, and the third user input, and controls the UI generator to move the selected second UI menu item to the first section group and to display the moved second menu item with the first display size based on the first user input, the second user input, and the third user input,
wherein the first UI menu item and the second UI menu item are executable upon further user input,
wherein the controller comprises a processor,
wherein the user interface comprises a plurality of latticed sections formed to be visibly distinct from each other and to include a UI menu item therein, respectively, and each of the plurality of section groups is assigned a different number of latticed sections from among the plurality of latticed sections.

16. The display apparatus, according to claim 15, wherein the user input part comprises a touch screen equipped in the display and the display apparatus is a mobile device.

17. The display apparatus according to claim 15, wherein:
the controller causes a selection of largest UI menu item from the two UI menu items to perform the corresponding function based on additional user input, and
prior to the selecting the largest UI menu item, the controller controls the UI generator so that the two UI menu items are exchanged in size such that the selected largest UI menu item of the two UI menu items is displayed in a larger size than the other one of the two UI menu items.

18. The display apparatus according to claim 17, wherein the first user interface is a touch screen of a mobile station.

19. The display apparatus according to claim 15,
wherein the controller controls the display to decrease the display size of a UI menu item selected among the plurality of UI menu items based on a second user input via the user input, and moves the selected menu item, based on the second user input, with a decreased display size to a second different location on the display with respect to at least one of the other UI menu items among the plurality of UI menu items.

20. A method of controlling an image processing apparatus, comprising:
generating a user interface that shows a plurality of section groups, wherein a first section group, which occupies a first area on the user interface, has at least two UI menu items of a first display size, and a second section group, which occupies a second area on the user interface, has at least two UI menu items of a second display size different from the first display size;
receiving a first user input
selecting a first UI menu item in the first section group;
receiving a second user input selecting a second UI menu item in the second section group;
receiving a third user input for switching the first UI menu item and the second UI menu item;
moving the selected first UI menu item to the second section group and to display the moved first menu item with the second display size based on the first user input, the second user input, and the third user input; and
moving the selected second UI menu item to the first section group and to display the moved second menu item with the first display size based on the first user input, the second user input, and the third user input,
wherein the first UI menu item and the second UI menu item are executable upon further user input, and
wherein the user interface comprises a plurality of latticed sections formed to be visibly distinct from each other and to include a UI menu item therein, respectively, and each of the plurality of section groups is assigned a different number of latticed sections from among the plurality of latticed sections.

21. The method according to claim 20, further comprising:
generating a second user interface for selecting the UI menu item to be decreased or increased in size and for determining the size of the UI menu item based on the user input, and
decreasing or increasing the size of the UI menu item based on the determined size of the UI menu item.

22. The method according to claim 21, wherein
the second user interface comprises a plurality of names of UI menu items of the first user interface, and at least one of current sizes of the UI menu items and size ranges of the UI menu items capable of being decreased or increased.

23. The method according to claim 20, further comprising:
generating a third user interface for selecting the UI menu item to be decreased or increased in size and an area corresponding to the UI menu item based on the user instruction, and
decreasing or increasing the size of the UI menu item so that the UI menu item occupies the area.

24. The method according to claim 23, wherein
the third user interface comprises an identity-number that is allotted to at least one of the UI menu item and the area.

25. The method according to claim 20, wherein the decreasing or increasing of the size of the UI menu item further comprises causing the two UI menu items of the plurality of UI menu items having different sizes to exchange their positions.

26. The method according to claim 20, further comprising:
selecting largest UI menu item from the two UI menu items to perform the corresponding function based on additional user input,
wherein prior to the selecting the largest UI menu item, the two UI menu items are exchanged in size such that the selected largest UI menu item of the two UI menu items is displayed in a larger size than the other one of the two UI menu items.

27. The method according to claim 20, wherein the user interface is a touch screen of a mobile station.

28. A method of controlling a display apparatus, comprising:
generating a user interface (UI) that shows a plurality of section groups, wherein a first section group, which occupies a first area on the user interface, has at least two UI menu items of a first display size, and a second section group, which occupies a second area on the user interface, has at least two UI menu items of a second display size different from the first display size;

displaying the one or more UI menu items of the first and second section groups;

receiving a first user input selecting a first UI menu item in the first section group;

receiving a second user input selecting a second UI menu item in the second section group;

moving the selected first UI menu item to the second section group and to display the moved first menu item with the second display size based on the first user input, the second user input, and the third user input; and moving the selected second UI menu item to the first section group and to display the moved second menu item with the first display size based on the first user input, the second user input, and the third user input, wherein the first UI menu item and the second UI menu item are executable upon further user input, and wherein the user interface comprises a plurality of latticed sections formed to be visibly distinct from each other and to include a UI menu item therein, respectively, and each of the plurality of section groups is assigned a different number of latticed sections from among the plurality of latticed sections.

29. The method according to claim 28, further comprising:

selecting largest UI menu item from the two UI menu items to perform the corresponding function based on additional user input, wherein prior to the selecting the largest UI menu item, the two UI menu items are exchanged in size such that the selected largest UI menu item of the two UI menu items is displayed in a larger size than the other one of the two UI menu items.

30. The method according to claim 28, wherein the first user interface is a touch screen of a mobile station.

* * * * *